United States Patent Office 3,767,671
Patented Oct. 23, 1973

1

3,767,671
TRIMELLITIMIDE DERIVATIVES
Johann F. Klebe, Henry A. Wroblewski, and Alfred R. Gilbert, Schenectady, N.Y., assignors to General Electric Company
No Drawing. Filed Sept. 1, 1971, Ser. No. 177,099
Int. Cl. C07d 27/52
U.S. Cl. 260—326 N    2 Claims

ABSTRACT OF THE DISCLOSURE

Trimellitimide can be made by heating a mixture of trimellitic anhydride and an ammonium compound such as ammonium carbonate resulting in the evolution of carbon dioxide and water. The trimellitimide can thereafter be contacted with formaldehyde and an alkali hydroxide to convert it to the alkali metal salt of the corresponding hydroxymethyl derivative. By treating the aforementioned alkali metal salt with an acidic aqueous solution, it can be converted to N-hydroxymethyl trimellitimide, which can be used to make the halomethyl and corresponding ether derivatives. The compounds produced by the aforedescribed methods can be used as sizing agents for glass fibers and cellulosic materials to improve the shear modulus of composites made from such treated fibers and organic matrix materials, such as epoxy resins.

The present invention relates to a method for making trimellitimide and derivatives of trimellitimide, and to the compounds made by such method. The trimellitimide provided by the method of the present invention can be made by heating a mixture of trimellitic anhydride and ammonium carbonate as shown by the following equation:

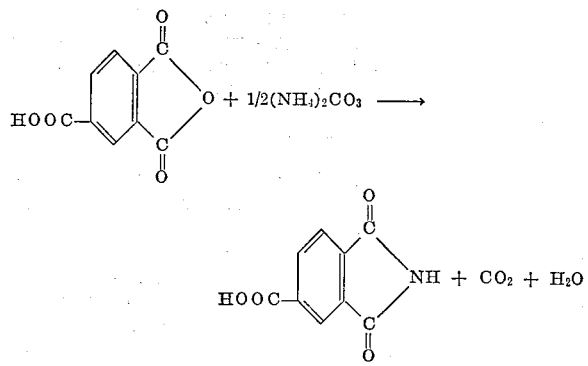

The trimellitimide can be reacted with base and aldehyde to provide for hydroxy alkyl trimellitimides and derivatives for example, haloalkyl, and ether derivatives included by the following formula,

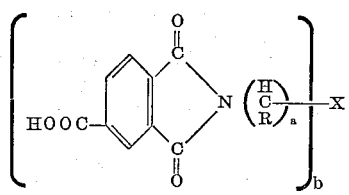

where R is hydrogen or a monovalent hydrocarbon radical, X is selected from halogen, hydroxy and oxygen

2 and $a$ is an integer equal to 1 to 4 inclusive, and $b$ is an integer having a value of 1 or 2. Radicals included by R are for example, C(1-8) alkyl radicals, such as methyl, etc.; phenyl, etc. For example, trimellitimide can be converted to the corresponding hydroxy methyl salt derivative by reacting it with formaldehyde and an alkali hydroxide which can be treated with a mineral acid as shown by the following equation:

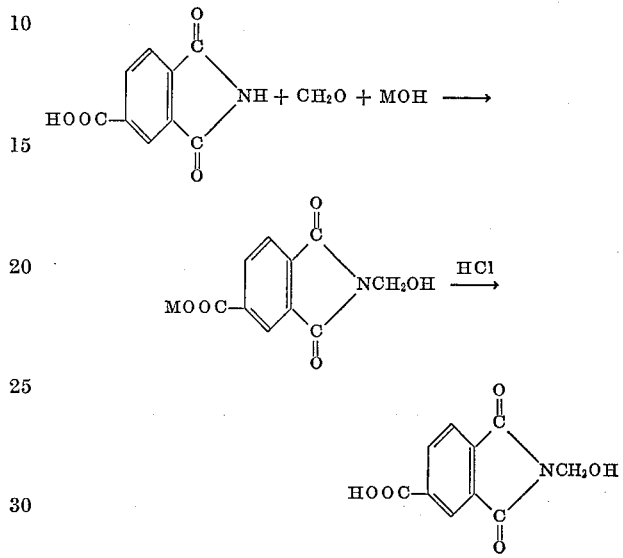

where M is an alkali metal, such as sodium, potassium, lithium, etc.

Hydroxy methyl trimellitimide can be converted to the corresponding ether by treating it with a strong aqueous acidic reagent such as concentrated hydrochloric acid.

Trimellitimide and derivatives derived therefrom can be employed as sizing agents to improve the bond strength between fibrous material, such as glass fibers, cellulosic fibers, such as cotton, etc., and organic matrix materials, such as epoxy resins, maleimides, etc., to provide for composites having improved shear modulus.

In making the trimellitimide of the present invention, reaction can be effected between equal molar amounts of trimellitic anhydride and instead of ammonium carbonate, other volatile ammonia compounds such as ammonium acetate etc. may be used. The ammonium compound can be added to a melt of the trimellitic anhydride and the resulting mixture heated at a temperature in the range of between 250° C. to 300° C. If desired, the ammonium compound can be added to the trimellitic anhydride to provide molar excess of 50% or more of ammonia, over the moles of trimellitic anhydride employed to insure the complete conversion of the trimellitic anhydride. The trimellitimide can be purified by sublimation, if desired, after the mixture has been allowed to cool.

The trimellitimide can be reacted with an aldehyde, such as acetaldehyde, benzaldehyde, formaldehyde, in the presence of an alkaline catalyst, for example, an alkali metal hydroxide, such as sodium hydroxide, potassium hydroxide, etc., to produce the corresponding hydroxy alkyl alkali metal salt. Reaction can be effected with stirring in the presence of excess water between equal moles of the reactants. The aldehyde is preferably used in excess amounts and can be used as an aqueous mixture, such as Formalin. Additional water can be used if desired. The hydroxy methyl alkali metal salt readily separates out. The precipitate can be treated with an aqueous mineral acid, such as hydrochloric acid, sulfuric acid to convert the salt to the hydroxymethyltrimellitimide.

As shown in the copending application Ser. No. 177,176, filed concurrently herewith and assigned to the same assignee as the present invention, the hydroxymethyltrimellitimide and derivatives of such materials, such as the halomethyl trimellitimide and the corresponding ether can be employed as intermediates to provide for the introduction into high molecular weight aromatic carbocyclic polymers, such as polyphenylene oxide, polycarbonates, etc. of trimellitimido methyl radicals along the polymer backbone or on aromatic carbocyclic radicals in the pendant position along the polymer backbone using a Friedel-Crafts catalyst, such as boron trifluoride.

In order that those skilled in the art will be better able to practice the invention, the following examples are given by way of illustration and not by way of limitation. All parts are by weight.

Example 1

Ammonium carbonate was slowly added to a trimellitic anhydride melt over a period of about 1 hour. A 50% molar excess of ammonium carbonate was employed over the moles of trimellitic anhydride to insure complete reaction. The mixture was heated for 1 hour to a temperature of 260°–280° C. until a clear gold-brown melt was obtained. The melt was then allowed to cool to a light yellow solid. There was obtained a 95% yield of crude product. Based on method of preparation and its infrared and nuclear magnetic resonance spectra, the product was trimellitimide. It was readily purified by sublimation.

*Elemental analysis.*—Calc. for $C_9H_5NO_4$ (percent): C, 56.6; H, 2.6; N, 7.3. Found (percent): C, 5.69; H, 2.63; N, 7.19.

A 10% solution of the trimellitimide in ethyl alcohol is employed to treat several glass fibers by covering the fibers with the solution and allowing the solvent to evaporate. The fibers are then treated with a 10% solution of an epoxy resin in methylethyl ketone. The epoxy resin is a bisphenol epichlorohydrin reaction product and employs a methyl endomethylene tetrahydrophthalic anhydride curing agent. Solvent is evaporated from the fibers at 60° C. for 45 seconds to produce a prepreg. A 1½" test bar is made at 600 p.s.i. for 1 hour at 150° C. and 16 hours at 175° C. in an air oven.

The same procedure is repeated except that the glass fibers are not treated with the solution of trimellitimide. The test bars are tested in an Instron tester to determine their respective shear modulus. It is found that the test bar made from the glass fibers treated with the trimellitimide shows a substantially higher shear modulus than the test bar made from untreated glass fibers.

Example 2

There was mixed 118 parts of trimellitimide and 50 parts of a 37% Formalin solution. There was then added 150 parts of water to the resulting mixture along with a 100 parts of a 25% sodium hydroxide solution. The mixture was then allowed to rest for 12 hours. A product precipitated out in quantitative yield. Based on method of preparation, the product was the sodium salt of N-hydroxy methyl trimellitimide. It was filtered and dried.

A 10% aqueous solution of the sodium salt of hydroxymethyltrimellitimide was utilized to treat glass fibers to determine its effectiveness as a sizing agent. The shear modulus of a test bar made from the resulting treated fibers in an epoxy resin matrix as described in Example 1, is significantly higher than a test bar made by the same procedure using untreated glass fibers.

Example 3

The sodium salt of N-hydroxymethyl trimellitimide was suspended in ethanol and acidified with hydrogen-chloride gas. The resulting mixture containing suspended sodium chloride was filtered and concentrated. There was obtained a solid which was washed with water and recrystallized from acetonitrile. The yield of solid was 30% based on the weight of starting salts. Based on method of preparation and elemental analysis the product was N-hydroxymethyltrimellitimide. The NMR spectrum showed 2 methylene hydrogens and 3 aromatic hydrogens and further confirmed the structure of the product.

N-acetoxymethyltrimellitimide was prepared by mixing 1 part of N-hydroxy methyl trimellitimide, 10 parts of pyridine and 0.46 part of acetic anhydride. After 1 hour of stirring a clear solution was obtained. After an additional 3 hours, the pyridine salt of the acetate crystallized out. The mixture was filtered and the product generated by heating the salt at 120° C. in vacuum. Based on method of preparation and elemental analysis the product is N-acetoxytrimellitimide. The NMR spectrum shows aromatic hydrogen, methylene hydrogen and acetyl hydrogen in the ratio of 3:2:3 further confirming the structure of the product.

In accordance with the procedure of Example 1, several glass fibers were treated with a 10% solution of N-hydroxy methyltrimellitimide in ethanol. A test bar is then made with epoxy resin utilizing the treated fibers in accordance with the method of Example 1. A comparison of the same test bar employing untreated glass fibers shows that the N-hydroxymethyltrimellitimide imparts valuable sizing properties to the glass fibers resulting in an increase of the shear modulus of the composite.

Example 4

A mixture of 5 parts of N-hydroxy trimellitimide and 100 parts of benzene is refluxed with 1 part of concentrated sulfuric acid in an apparatus fitted with a Dean-Stark trap. Heating is continued until no more water is removed from the mixture. The solvent is evaporated and the colorless solid product washed with water. Based on method of preparation, the product is trimellitimidomethyl ether.

Trimellitimidomethyl ether is used to treat the surface of glass fibers as described in Example 1. A prepreg containing glass fibers and an epoxy resin is fabricated in accordance with Example 1. A significantly higher shear modulus is found with the test bar made containing treated glass fibers as compared to the bar with untreated glass fibers.

Example 5

A mixture containing 10 parts of N-hydroxymethyl trimellitimide of Example 3 and 100 parts of thionylchloride is refluxed until the evolution of hydrogen chloride and sulfur dioxide has ceased. The crude product is dissolved in tetrahydrofuran. It is washed with aqueous sodium bicarbonate solution to neutralize free acid. A quantitative yeild of product is recovered by evaporation of the solvent. Based on method of preparation the product is N-chloromethyl trimellitimide.

A solution is prepared of 10 parts of a poly(2,6-dimethyl phenylene oxide) having a molecular weight of about 50,000 and 1 part of N-chloromethyl trimellitimide in 70 parts of methylene chloride and 30 parts of nitrobenzene. The solution is saturated with boron trifluoride and the mixture agitated at room temperature for 24 hours. A product is precipitated from the mixture after it is poured into methanol. Based on method of preparation, the product is a trimellitimido methyl substituted poly(2,6-dimethyl phenylene oxide).

A solution of 2 parts of the above polyimide in 98 parts of a 2:1 mixture of N-methyl pyrrolidone and water is prepared using the polyimide with all of its carboxy radicals neutralized with ammonium hydroxide. The polyimide is electrocoated for 1 minute on a copper wire employing a potential of 300 v. A flexible film is obtained after the electrodeposited polyimide is cured for 1 minute at 125° C. and 7 minutes at 250° C.

What is claimed is:
1. Chloromethyltrimellitimide.
2. Trimellitimidomethyl ether.

References Cited

UNITED STATES PATENTS 3,060,191  10/1962  Kolb et al. _____ 260—326

OTHER REFERENCES

Abidova et al.: Chem. Abs. 54: 22480 (1960).
Wagner et al.: Synthetic Organic Chemistry (1953) pp. 567–68.

JOSEPH A. NARCAVAGE, Primary Examiner

U.S. Cl. X.R.

260—326 A, 2 EP, 37 EP; 161—185